United States Patent [19]

Lachman

[11] 4,300,953

[45] Nov. 17, 1981

[54] DENSE CORDIERITE CONTAINING MANGANESE

[75] Inventor: Irwin M. Lachman, Corning, N.Y.

[73] Assignee: Corning Glass Works, Corning, N.Y.

[21] Appl. No.: 165,611

[22] Filed: Jul. 3, 1980

[51] Int. Cl.$^3$ .................... C04B 35/04; C04B 35/10
[52] U.S. Cl. ...................... 501/112; 501/9; 501/153; 501/118
[58] Field of Search ................ 106/62, 73.4

[56] References Cited

U.S. PATENT DOCUMENTS

| | | | |
|---|---|---|---|
| 3,885,997 | 5/1975 | Lachman et al. | 106/73.5 |
| 3,950,175 | 4/1976 | Lachman et al. | 106/62 |
| 4,001,028 | 1/1977 | Frost et al. | 106/62 |
| 4,191,583 | 3/1980 | Armistead et al. | 106/73.4 |

FOREIGN PATENT DOCUMENTS

| | | | |
|---|---|---|---|
| 611854 | 3/1935 | Fed. Rep. of Germany | 106/62 |
| 679917 | 8/1939 | Fed. Rep. of Germany | 106/62 |
| 282403 | 8/1928 | United Kingdom | 106/62 |
| 282404 | 12/1928 | United Kingdom | 106/62 |
| 888227 | 1/1962 | United Kingdom | 106/62 |

OTHER PUBLICATIONS

Holland et al., "Reactions of $Mn_2O_3$ and $MnCO_3$ With Kaolinite Between 600° and 1140° C.", J. Australian Ceramic Society, vol. 12, No. 2, pp. 37–40, (1976).

*Primary Examiner*—Earl C. Thomas
*Assistant Examiner*—Mark Bell
*Attorney, Agent, or Firm*—Richard N. Wardell

[57] ABSTRACT

Impervious, unglazed, sintered ceramic products of primarily cordierite crystal phase, exhibiting low coefficients of thermal expansion and having analytical molar composition of about 1.7–2.4 RO . 1.9–2.4 $Al_2O_3$ . 4.5–5.2 $SiO_2$, are formed of mineral batch compositions that are: (a) wholly raw ceramic material wherein RO comprises about 55–95 mole % MnO and 5–45% MgO, or (b) at least about 50 wt.% prereacted cordierite material and the balance thereof raw ceramic material, and wherein RO comprises about 5–40 mole % MnO and 60–95 mole % MgO.

8 Claims, No Drawings

DENSE CORDIERITE CONTAINING MANGANESE

BACKGROUND OF THE INVENTION

The sintering of unfluxed raw batch materials having a cordierite composition to full density is very difficult to achieve due to the narrow firing temperature range between the point where a porous sintered body is attained and the point where a body becomes overfired with resultant melting, bloating and/or other deformation. When fairly high density can be achieved, it is at temperature dangerously close to overfiring, rendering commercial production of good ware unreliable even under customary controlled furnace temperature variation.

As used in this application:
(a) "full density" and "impervious" mean the condition of a ceramic body whereby it exhibits less than 1% by volume of open porosity as determined either by the conventional mercury porosimetry test or by the boiling water test for apparent porosity generally as defined in ASTM Designation C20-70 effective Jan. 22, 1970, both of which give essentially the same results for products of the invention stated herein;
(b) "raw" means the condition of ceramic batch material which is not prereacted with another batch ingredient, but which may have been individually calcined or fired without melting thereof or otherwise is unfired;
(c) "prereacted" means the condition of ceramic batch material which has been formed by reaction between two or more raw materials with, at most, melting of only minor portions thereof; and
(d) "mineral batch composition" means a ceramic batch composition in which all of the ceramic material is raw and/or prereacted.

Unfluxed sintered cordierite bodies made from raw ceramic batch material commonly have significant open porosity (see U.S. Pat. No. 3,950,175, column 2, lines 13-26), but they also have higher melting points and use temperatures. Such bodies have been proposed in which as much as 98% by weight of the MgO can be replaced by MnO in the raw batch (see U.S. Pat. No. 3,885,977, column 2, lines 55-63).

It was earlier proposed in British patent specification No. 282,404 to add small amounts, such as 4-8 wt. %, of manganese oxide to $MgO$—$Al_2O_3$—$SiO_2$ raw batches fired to form ceramic bodies. The manganese oxide was said to prevent or minimize formation of vitreous amorphous phase and to promote only the microcrystalline phases as noted in the preceding British patent specification No. 282,403, viz. a phase like sillimanite or mullite and a magnesium silicate phase like enstatite or forsterite. Such bodies were noted for their coefficients of thermal expansion being lower than those of steatite type ceramics. No indication is given about the presence or absence of impervious condition in these bodies, particularly those modified with manganese oxide.

However, German Pat. No. 611,854 asserts that certain $MgO$—$Al_2O_3$—$SiO_2$ raw batches can be fired dense without having to add fluxing substances. This patent also indicates that some small amount of a forth component of iron oxide or other heavy metal oxide can be added, e.g. as by being an impurity in the clay of the batches. However, no clear indication is given of the presence or absence of full density in the resultant bodies without deformation thereof.

German Pat. No. 679,917 appears to suggest a new product application of the four component composition of German Pat. No. 611,854. For unglazed bodies, iron oxide may range between 2-6 wt. %. More iron oxide can be used, up to 15 wt. %, in glazed bodies.

British patent specification No. 888,227 discloses that densely vitrified cordierite bodies can be made from raw ceramic batches with a wider firing range by the required addition of lithium aluminum silicate flux and the optional further addition of iron oxide and/or manganese oxide. In the absence of the lithium aluminum silicate flux, it is noted that feldspar is a necessary flux in combination with the iron oxide and/or manganese oxide additions, but it causes an undesirable increase in coefficient of thermal expansion.

Full density is also difficult to attain in firing some sinterable/crystallizable glass powders (formed by fully melting raw ceramic batch materials) to glass-ceramic products, as noted in U.S. Pat. No. 4,191,583. That patent describes impervious, sintered, Mn—Mg cordierite glass-ceramic products made from crystallizable glass powders or cerammed powders, but it gives no indication about attaining or not attaining full density in sintered cordierite products resulting from firing mineral batch compositions.

Holland et al., J. Australian Ceram. Soc., 12(2), pp. 37-40 (1976) point out the difficulty of forming manganese cordierite ($2MnO.2Al_2O_3.5SiO_2$) by firing raw batch materials, except by repeated overnight firings at 1130°-1140° C. No indication is given that such fired products had full density.

SUMMARY OF THE INVENTION

It has now been discovered that sintered products characterized by full density, having a cordierite crystal structure and low thermal expansion coefficients, can be formed of manganese-containing mineral batch compositions which comprise narrower compositional ranges than that disclosed in U.S. Pat. No. 3,885,977.

It has further been discovered that the impervious manganese-containing cordierite sintered product can be more economically and more desirably manufactured where prereacted cordierite material comprises at least 50 wt. % (especially 50-95 wt. %) of the ceramic batch materials.

The invention is an impervious, unglazed, sintered manganese-containing ceramic product having its major and primary crystal phase being cordierite crystal structure, having an analytical molar composition of about $1.7$-$2.4\ RO.1.9$-$2.4Al_2O_3.4.5$-$5.2SiO_2$ and made of mineral batch composition selected from:
(a) wholly raw ceramic material wherein RO comprises, as mole % of RO, about 55-95% MnO and 5-45% MgO, and
(b) at least about 50 wt. % prereacted cordierite material and the balance thereof being raw ceramic material, and wherein RO comprises, as mole % of RO, about 5-40% MnO and 60-95% MgO.

In the case of invention products made of wholly raw ceramic material, the more desirable products have RO proportioned as about 74-90 mole % MnO and 10-26 mole % MgO.

In the case of invention products made of mixtures of raw ceramic material and prereacted cordierite material, the more desirable products have RO proportioned as about 6-15 mole % MnO and 85-94 mole % MgO.

Moreover, it is preferable to have the prereacted cordierite material be about 80–90 wt. % of the mineral batch composition.

For the most preferred form of the invention, its molar composition is about 1.9–2.1RO.1.9–2.1Al$_2$O$_3$.4.9–5.1SiO$_2$.

When desired, MgO in the above formulations can be partially replaced by other oxide such as NiO, CoO, FeO and/or TiO$_2$ in the manner described in U.S. Pat. No. 3,885,977 (column 2, lines 55–64). Accordingly, recital herein of MgO is intended to include such optional partial substitutions in the present invention.

The products of this invention not only sinter to impervious condition, but exhibit typical low coefficients of thermal expansion (CTE) on the order of about 15–20×10$^{-7}$/°C. (25°–1000° C.).They are particularly applicable to the production of honeycomb structures by the methods of U.S. Pat. Nos. 3,790,654, 3,899,326, 3,900,546 and 3,919,384, and to the manufacture of ceramic cements for bonding or plugging of cordierite honeycomb structures with similar low CTEs. In particular, the products of this invention in the form of honeycomb structures are useful in constructing industrial heat recovery wheels.

DETAILED DESCRIPTION

The dense cordierite sintered structure of this invention is formed by the partial substitution of MnO for MgO in the cordierite crystal structure within controlled amounts. That substitution greatly increases the sinterability of the cordierite batch materials by lowering and widening the sintering temperature range at which full density can be achieved. In general, the sintering of mineral batch compositions comprised of wholly raw ceramic materials to full density occurred at about 1200°–1300° C., whereas mineral batch compositions containing prereacted cordierite material sintered to impervious conditions at about 1250°–1410° C. Also, when prereacted cordierite material is included in the mineral batch composition, the minimum weight percent manganese oxide necessary to form the impervious product is about 0.6 wt. %, as compared to a minimum of about 12.6 wt. % for the mineral batch composition with wholly raw ceramic materials. Therefore, the benefits of utilizing the mineral batch compositions containing prereacted cordierite material are that a more refractory product is produced (similar to regular cordierite without manganese oxide) and that lesser amounts of manganese oxide are required to effect full density. Furthermore, less firing shrinkage is generally experienced with the mineral batch compositions containing prereacted cordierite material.

Full density either is unattainable or cannot be reliably attained with mineral batch compositions which either have wholly raw batch material and too little molar proportion of MnO (i.e. less than 55 mole % of RO), or which contain prereacted cordierite material in amounts which are too small (i.e. less than 50 wt. % of the mineral batch composition), or which contain at least about 50 wt. % prereacted cordierite material while having a mole proportion of MnO outside the range of 5–40% of RO. The mineral batch composition of wholly prereacted cordierite material can be fired to full density at about 1410° C., but it requires extra expense of thoroughly fine grinding of such batch material prior to shaping and firing it into impervious product.

Impervious sintered products of the invention may contain minor amounts of phases other than the primary cordierite phase as may occur within the molar compositional limits defined above.

Although the impervious products of the invention can be fabricated into a variety of forms by any of the usual or known ceramic forming techniques, a series of samples of the invention as noted in Tables 1 and 3 were made in the preferred form of honeycomb structures by the previously noted method of extrusion and firing. The batch ceramic materials were dry blended with (as wt. % of the total ceramic materials therein) 4.0% methyl cellulose plasticizer/binder and 0.5% alkali stearate extrusion aid. Those mixtures were plasticized with the water in a mix-muller, and further plasticized and deaired by pre-extrusion into spaghetti-like masses. Then the fully plasticized and compacted batches were extruded in honeycomb green shapes, dried and fired.

Tables 1 and 3 also set forth the analytical molar compositions as calculated from the batch ceramic materials.

Table 2 sets forth the sintering temperatures, firing shrinkages and CTEs for the Samples 1–4 of Table 1 made of mineral batch compositions with wholly raw ceramic materials and exhibiting less than 1% by volume of open porosity. Such temperatures were the approximate lowest temperatures for full density.

TABLE 1

| Batch Materials[a] | Samples | | | |
|---|---|---|---|---|
| weight % of total ceramic materials | 1 | 2 | 3 | 4 |
| Georgia-Kaolin Kaopaque 10 clay (APS 10) | 16.50 | 16.45 | 16.47 | 16.49 |
| Georgia-Kaolin Glomax LL clay (APS 1.9) | 55.55 | 48.98 | 47.11 | 45.66 |
| Penn. Glass Sand Minusil silica (APS 5) | — | — | 3.02 | 5.35 |
| Pfizer MP 40-27 talc (APS 3.5) | 15.43 | 12.48 | 7.55 | 3.74 |
| Baker reagent MnCO$_3$ powder | — | 22.10 | 25.86 | 28.77 |
| Diamond Shamrock MnO Type HPX powder | 12.51 | — | — | — |
| Distilled water plasticizer | 43.0 | 48.8 | 46.3 | 40.7 |
| Analytical Composition - mole % | | | | |
| MnO | 12.8 | 14.5 | 17.4 | 19.8 |
| MgO | 9.4 | 7.9 | 4.9 | 2.5 |
| Al$_2$O$_3$ | 22.2 | 22.5 | 22.4 | 22.3 |
| SiO | 55.6 | 55.1 | 55.3 | 55.4 |
| MnO as % of RO | 57.7 | 74.7 | 78.0 | 88.8 |
| MgO as % of RO | 42.3 | 35.3 | 22.0 | 11.2 |

[a] APS means average particle size in micrometers.

TABLE 2

| Sample | Sintering Temperature °C. | % Firing Shrinkage | CTE × 10$^{-7}$/°C. 25–100° C. |
|---|---|---|---|
| 1 | 1285 | 13.2 | 17.5 |
| 2 | 1300 | 19.7 | 19.7 |
| 3 | 1200 | 12.0 | 16.4 |
| 4 | 1200 | 19.4 | 18.4 |

In contrast to Samples 1–4, other similarly prepared samples with wholly raw ceramic materials, but not within this invention because of having molar proportions of MnO that were 50 mole % or less of RO, failed to develop full density at sintering temperatures that did not cause overfiring. For example, a sample with the analytical molar composition of about 0.8MnO.1.2-MgO.2Al$_2$O$_3$.5 SiO$_2$ (wherein MnO is 40 mole % of RO) exhibited 47% by volume of open porosity after being fired at sintering temperature of 1240° C.

TABLE 3

| Batch Materials[a] | Samples | | | | |
|---|---|---|---|---|---|
| weight % of total ceramic materials | 5 | 6 | 7 | 8 | 9 |
| Georgia-Kaolin Kaopaque | | | | | |

TABLE 3-continued

| Batch Materials[a] weight % of total ceramic materials | Samples | | | | |
|---|---|---|---|---|---|
| | 5 | 6 | 7 | 8 | 9 |
| 10 clay (APS 10) | 32.20 | 12.88 | 10.00 | 10.00 | 6.44 |
| Penn. Glass Sand Minusil silica (APS 5) | 2.55 | 1.00 | 0.78 | 0.78 | 0.50 |
| Pfizer MP 96-28 Montana talc (APS 20) | 1.90 | 0.76 | 0.59 | 0.59 | 0.38 |
| Baker reagent McCO3 powder | 13.35 | 5.34 | 4.15 | 4.15 | 2.67 |
| Prereacted cordierite material #1 (APS 9) | 50.00 | 80.00 | 84.48 | — | 90.00 |
| Prereacted cordierite material #2 (APS 8.8) | — | — | — | 84.48 | — |
| Distilled water plasticizer | b | b | 38 | 26 | b |
| Analytical Composition - mole % | | | | | |
| MnO | 8.1 | 3.0 | 2.2 | 2.2 | 1. |
| MgO | 14.3 | 19.7 | 20.4 | 20.4 | 21.2 |
| Al2O3 | 22.8 | 22.8 | 22.7 | 22.7 | 22.8 |
| SiO2 | 54.8 | 54.5 | 54.7 | 54.7 | 54.5 |
| MnO as % of RO | 36.2 | 13.2 | 9.7 | 9.7 | 6.6 |
| MgO as % of RO | 63.8 | 86.8 | 90.3 | 90.3 | 93.4 |

[a]APS means average particle size in micrometers.
[b]Amount was sufficient to render batch plastic for extrusion into honeycomb body (similar to Sample 7)

The Samples 5–9 in Table 3 illustrate the mineral batch compositions of the invention containing prereacted cordierite material. Prereacted cordierite material #1 is essentially the same as fired composition F in U.S. Pat. No. 3,885,977, but in crushed and ground particulate form. Prereacted cordierite material #2 is essentially the same as fired Composition 804 in U.S. Pat. No. 4,001,028, but in crushed and ground particulate form.

Table 4 sets forth the sintering temperatures, firing shrinkages and CTEs for the Samples 5–9 of Table 3 exhibiting less than 1% by volume of open porosity. Such temperatures were the approximate lowest temperatures for full density.

TABLE 4

| Sample | Sintering Temperature °C. | % Firing Shrinkage | CTE × $10^{-7}$/°C. 25–1000° C. |
|---|---|---|---|
| 5 | 1250 | 15.4 | 17.1 |
| 6 | 1390 | 14.6 | 17.8 |
| 7 | 1400 | 16–18 | 16.7 |
| 8 | 1400 | 16–18 | 18.0 |
| 9 | 1410 | 17.0 | 17.0 |

Other samples with either less than 50 wt. % prereacted cordierite or having MnO substantially outside the range of 5–40 mole % of RO while also having at least 50 wt. % prereacted cordierite cannot be reliably made with full density.

I claim:

1. An impervious, unglazed, sintered manganese-containing ceramic product having its major and primary crystal phase being cordierite crystal structure, having an analytical molar composition of about 1.7–2.4RO.1-.9–2.4Al$_2$O$_3$.4.5–5.2 SiO$_2$ and made of mineral batch composition selected from:
   (a) wholly raw ceramic material wherein RO comprises, as mole % of RO, about 55–95% MnO and 5–45% MgO, and
   (b) at least about 50 wt. % prereacted cordierite material and the balance thereof being raw ceramic material, and wherein RO comprises, as mole % of RO, about 5–40% MnO and 60–95% MgO.

2. The product of claim 1 wherein the selected mineral batch composition is the wholly raw ceramic material.

3. The product of claim 2 wherein RO comprises about 74–90 mole % MnO and 10–26 mole % MgO.

4. The product of claim 1 wherein the selected mineral batch composition is at least about 50 wt. % prereacted cordierite material and the balance thereof being raw ceramic material.

5. The product of claim 4 wherein the prereacted cordierite material is about 50–95 wt. % of the mineral batch composition.

6. The product of claim 5 wherein RO comprises about 6–15 mole % MnO and 85–94 mole % MgO.

7. The product of claim 4, 5 or 6 wherein the prereacted cordierite material is about 80–90 wt. % of the mineral batch composition.

8. The product of claim 1 wherein the analytical molar composition is about 1.9–2.1RO.1.9–2.1Al$_2$O$_3$.4-.9–5.1 SiO$_2$.

* * * * *